(12) United States Patent
Podluzhny

(10) Patent No.: US 11,184,745 B2
(45) Date of Patent: Nov. 23, 2021

(54) ACTOR SYSTEM AND METHOD FOR TRANSMITTING A MESSAGE FROM A FIRST ACTOR TO A SECOND ACTOR

(71) Applicant: YANDEX EUROPE AG, Lucerne (CH)

(72) Inventor: Denis Nikolaevich Podluzhny, Syktyvkar (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/776,011

(22) Filed: Jan. 29, 2020

(65) Prior Publication Data
US 2020/0252761 A1 Aug. 6, 2020

(30) Foreign Application Priority Data

Feb. 6, 2019 (RU) .......................... RU2019103253

(51) Int. Cl.
*H04W 4/14* (2009.01)
*H04L 12/58* (2006.01)
(Continued)

(52) U.S. Cl.
CPC ............... *H04W 4/14* (2013.01); *H04L 51/38* (2013.01); *H04L 69/08* (2013.01); *H04W 4/18* (2013.01); *H04W 4/70* (2018.02)

(58) Field of Classification Search
CPC ......... H04L 51/30; H04L 51/38; H04L 69/08; H04L 69/40; H04L 12/58; H04L 29/06;
(Continued)

(56) References Cited

U.S. PATENT DOCUMENTS 5,247,677 A 9/1993 Welland et al.
5,278,984 A 1/1994 Batchelor
(Continued)

FOREIGN PATENT DOCUMENTS

CN 105653365 A 6/2016
CN 103514037 B 6/2018
(Continued)

OTHER PUBLICATIONS

Ex Parte Quale Action dated Apr. 23, 2020 received in respect of a related U.S. Appl. No. 16/383,976.
(Continued)

*Primary Examiner* — Meless N Zewdu
(74) *Attorney, Agent, or Firm* — BCF LLP

(57) ABSTRACT

A method of transmitting a message and a distributed computer system therefor are disclosed. The message is to be transmitted from a first actor to a second actor, the first actor is hosted by an actor system implemented in the distributed computer system. The method includes generating the message that has payload data and a trigger for triggering verification of whether the second actor has successfully received the message. The method includes sending, the message to the second actor. The method includes in response to determining, in response to the first trigger, that the second actor has not successfully received the message, instructing the first actor that the message is not received by the second actor.

30 Claims, 6 Drawing Sheets

(51) Int. Cl.
   *H04W 4/18*    (2009.01)
   *H04W 4/70*    (2018.01)
   *H04L 29/06*   (2006.01)

(58) Field of Classification Search
   CPC ... H04L 1/1816; H04L 1/1819; H04L 1/1829;
         H04L 1/1835; H04W 4/70; H04W 4/18;
         H04W 4/14; H04W 4/12; H04W 88/00;
         H04W 88/02; H04W 88/026; H04W
         88/08; H04W 88/16; H04W 88/18; H04W
         88/182; H04W 88/184; H04W 92/20;
         H04W 92/06; G06F 9/54; G06F 9/546
   See application file for complete search history.

(56) References Cited

U.S. PATENT DOCUMENTS

| | | |
|---|---|---|
| 5,577,202 A | 11/1996 | Padgett |
| 5,640,563 A | 6/1997 | Carmon |
| 5,845,316 A | 12/1998 | Hillyer et al. |
| 6,023,720 A | 2/2000 | Aref et al. |
| 6,256,755 B1 | 7/2001 | Hook et al. |
| 6,553,472 B2 | 4/2003 | Yang et al. |
| 6,757,897 B1 | 6/2004 | Shi et al. |
| 6,791,992 B1 | 9/2004 | Yun et al. |
| 6,851,115 B1 | 2/2005 | Cheyer et al. |
| 6,859,931 B1 | 2/2005 | Cheyer et al. |
| 7,073,021 B2 | 7/2006 | Iren et al. |
| 7,177,866 B2 | 2/2007 | Holenstein et al. |
| 7,474,989 B1 | 1/2009 | Wilcoxon |
| 7,562,362 B1 | 7/2009 | Paquette et al. |
| 7,971,093 B2 | 6/2011 | Goel et al. |
| 8,037,024 B1 | 10/2011 | Bozkaya et al. |
| 8,117,621 B2 | 2/2012 | Singh et al. |
| 8,145,838 B1 | 3/2012 | Miller et al. |
| 8,254,172 B1 | 8/2012 | Kan et al. |
| 8,595,302 B2 | 11/2013 | Krishnamurthi et al. |
| 8,799,913 B2 | 8/2014 | Yoo et al. |
| 8,826,301 B2 | 9/2014 | Kim et al. |
| 8,838,539 B1 | 9/2014 | Ashcraft et al. |
| 8,850,018 B2 | 9/2014 | Massa et al. |
| 8,850,446 B2 | 9/2014 | Avni et al. |
| 8,930,954 B2 | 1/2015 | Hildrum et al. |
| 8,966,490 B2 | 2/2015 | Avni et al. |
| 9,037,826 B1 | 5/2015 | Brooker et al. |
| 9,047,331 B2 | 6/2015 | Rao et al. |
| 9,093,160 B1 | 7/2015 | Ellis et al. |
| 9,203,900 B2 | 12/2015 | Rao et al. |
| 9,251,195 B2 | 2/2016 | Yamada |
| 9,304,694 B2 | 4/2016 | Colgrove et al. |
| 9,348,592 B2 | 5/2016 | Jha |
| 9,354,813 B1 | 5/2016 | Dolan et al. |
| 9,400,682 B2 | 7/2016 | Persikov et al. |
| 9,477,521 B2 | 10/2016 | Truong et al. |
| 9,489,443 B1 | 11/2016 | Muniswamy-Reddy et al. |
| 9,547,528 B1 | 1/2017 | McClure et al. |
| 9,569,339 B1 | 2/2017 | Villalobos et al. |
| 9,639,396 B2 | 5/2017 | Pho et al. |
| 9,699,017 B1 | 7/2017 | Gupta et al. |
| 9,811,391 B1 | 11/2017 | Barrett |
| 9,921,557 B2 | 3/2018 | Slupik et al. |
| 10,552,215 B1 | 2/2020 | Xu et al. |
| 10,572,323 B1 | 2/2020 | Zhai et al. |
| 2002/0099756 A1 | 7/2002 | Catthoor et al. |
| 2003/0115410 A1 | 6/2003 | Shriver |
| 2004/0213387 A1 | 10/2004 | Chandrasekaran |
| 2005/0047425 A1 | 3/2005 | Liu et al. |
| 2007/0002750 A1 | 1/2007 | Sang |
| 2007/0226332 A1 | 9/2007 | Becker-Szendy et al. |
| 2007/0268516 A1 | 11/2007 | Bugwadia et al. |
| 2007/0282660 A1 | 12/2007 | Forth et al. |
| 2008/0049633 A1 | 2/2008 | Edwards et al. |
| 2008/0168452 A1 | 7/2008 | Molaro et al. |
| 2008/0320482 A1 | 12/2008 | Dawson et al. |
| 2009/0013154 A1 | 1/2009 | Du et al. |
| 2009/0292744 A1 | 11/2009 | Matsumura |
| 2009/0300449 A1 | 12/2009 | Qian et al. |
| 2010/0011182 A1 | 1/2010 | Le Moal et al. |
| 2010/0035581 A1 | 2/2010 | Park et al. |
| 2010/0185847 A1 | 7/2010 | Shasha et al. |
| 2011/0145830 A1 | 6/2011 | Yamaguchi |
| 2011/0153566 A1 | 6/2011 | Larson et al. |
| 2011/0196834 A1 | 8/2011 | Kesselman et al. |
| 2011/0219100 A1 | 9/2011 | Dhuse et al. |
| 2011/0261698 A1 | 10/2011 | Kamerkar et al. |
| 2011/0314070 A1 | 12/2011 | Brown et al. |
| 2012/0046807 A1* | 2/2012 | Ruther et al. ............ 701/2 |
| 2012/0047317 A1 | 2/2012 | Yoon et al. |
| 2012/0066449 A1 | 3/2012 | Colgrove et al. |
| 2012/0124273 A1 | 5/2012 | Goss et al. |
| 2012/0204265 A1 | 8/2012 | Judge |
| 2012/0278801 A1 | 11/2012 | Nelson et al. |
| 2013/0042156 A1 | 2/2013 | Srinivasan et al. |
| 2013/0132057 A1 | 5/2013 | Deng et al. |
| 2013/0191836 A1 | 7/2013 | Meyer |
| 2013/0227186 A1 | 8/2013 | Laughton |
| 2013/0326161 A1 | 12/2013 | Cohen et al. |
| 2014/0019987 A1 | 1/2014 | Verma et al. |
| 2014/0074623 A1* | 3/2014 | Mohammadi et al. ............ G06Q 30/0269 |
| 2014/0157276 A1 | 6/2014 | Smithson et al. |
| 2014/0208327 A1 | 7/2014 | Cadambi et al. |
| 2014/0226565 A1* | 8/2014 | Velev et al. .......... H04W 40/20 |
| 2014/0250438 A1 | 9/2014 | Shin et al. |
| 2014/0282572 A1 | 9/2014 | Kang |
| 2014/0304601 A1 | 10/2014 | Rossano et al. |
| 2015/0127625 A1 | 5/2015 | Bulkowski et al. |
| 2015/0128149 A1 | 5/2015 | Meijer et al. |
| 2015/0237157 A1 | 8/2015 | Wang et al. |
| 2015/0347185 A1 | 12/2015 | Holt et al. |
| 2015/0347211 A1 | 12/2015 | Dang et al. |
| 2015/0347554 A1 | 12/2015 | Vasantham et al. |
| 2016/0149964 A1* | 5/2016 | Pastro ................ H04L 65/1069 |
| 2016/0188376 A1 | 6/2016 | Rosas et al. |
| 2016/0266934 A1 | 9/2016 | Rimoni |
| 2016/0291885 A1 | 10/2016 | Pendharkar et al. |
| 2017/0017676 A1 | 1/2017 | Levy et al. |
| 2017/0031713 A1 | 2/2017 | Campbell et al. |
| 2017/0048021 A1 | 2/2017 | Yanovsky et al. |
| 2017/0109203 A1 | 4/2017 | Liu et al. |
| 2017/0147488 A1 | 5/2017 | Vaquero |
| 2017/0177697 A1 | 6/2017 | Lee et al. |
| 2017/0308403 A1 | 10/2017 | Turull et al. |
| 2017/0374516 A1 | 12/2017 | Huo et al. |
| 2018/0006999 A1* | 1/2018 | Doukhvalov et al. ............ H04L 63/0209 |
| 2018/0041477 A1 | 2/2018 | Shaposhnik |
| 2018/0052710 A1 | 2/2018 | Choi et al. |
| 2018/0101448 A1 | 4/2018 | Ventura et al. |
| 2018/0114290 A1 | 4/2018 | Paltashev et al. |
| 2018/0157543 A1 | 6/2018 | Bellomo et al. |
| 2018/0260125 A1 | 9/2018 | Botes et al. |
| 2018/0293123 A1 | 10/2018 | Kondapalli et al. |
| 2018/0300385 A1 | 10/2018 | Merriman et al. |
| 2019/0163546 A1 | 5/2019 | Ungar et al. |
| 2019/0171763 A1 | 6/2019 | Cai et al. |
| 2019/0199515 A1 | 6/2019 | Carver et al. |
| 2019/0392061 A1 | 12/2019 | Terry et al. |
| 2020/0074416 A1 | 3/2020 | Mathew |
| 2020/0252761 A1* | 8/2020 | Podluzhny .............. H04W 4/14 |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |

(56) References Cited

FOREIGN PATENT DOCUMENTS

| RU | 2581551 C2 | 4/2016 |
|---|---|---|
| RU | 2628146 C2 | 8/2017 |
| RU | 2649788 C1 | 4/2018 |
| RU | 2665212 C2 | 8/2018 |
| RU | 2670573 C2 | 10/2018 |
| WO | 2012065018 A2 | 5/2012 |
| WO | 2016197716 A1 | 12/2016 |

OTHER PUBLICATIONS

Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Russian Search Report dated Oct. 30, 2019 issued in respect of the Russian Patent Application No. RU2018136221.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Ruemmier "An Introduction to Disk Drive Modeling", Hewlett Packard Laboratories, IEEE, Mar. 1994, pp. 17-29 (Mar. 1994).
Office Action dated Nov. 12, 2020 received in respect of a related U.S. Appl. No. 16/367,537.
Yuan et al, "Deadline divison-based heuristic for cost optimization in workflow scheduling". Information Sciences 179 (2009) 2562-2575, Elsevier, pp. 2562-2575 (Feb. 10, 2009).
Srinivasan et al, "Deadline-based scheduling of periodic task systems on multiprocessors", Information Processing Letters 84 (2002), 93-98, Elsevier, pp. 93-98 (Oct. 31, 2002).
Chopra et al, "Deadline and Cost based Workflow Scheduling in Hybrid Cloud", 2013, IEEE, pp. 840-846 (Oct. 21, 2013).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Jul. 16, 2015).
Office Action dated Dec. 4, 2020 received in respect of a related U.S. Appl. No. 16/401,688.
Office Action dated Jan. 1, 2021 received in respect of a related U.S. Appl. No. 16/384,301.
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Notice of Allowance dated Oct. 15, 2020 received in respect of a related U.S. Appl. No. 16/433,186.
Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).
Russian Search Report dated Jan. 18, 2021 issued in respect of the Russian Patent Application No. RU2019103253.
Office Action dated Mar. 10, 2021 received in respect of a related U.S. Appl. No. 16/367,537.
Notice of Allowance dated May 18, 2021 received in respect of a related U.S. Appl. No. 16/401,688.
Notice of Allowance dated Mar. 23, 2021 received in respect of a related U.S. Appl. No. 16/574,277.

* cited by examiner

ACTOR SYSTEM AND METHOD FOR TRANSMITTING A MESSAGE FROM A FIRST ACTOR TO A SECOND ACTOR

CROSS-REFERENCE

The present application claims priority to Russian Patent Application No. 2019103253, entitled "Method and System for Transmitting a Message", filed Feb. 6, 2019, the entirety of which is incorporated herein by reference.

FIELD

The present technology relates to distributed data processing and, specifically, to a method and system for transmitting a message.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

SUMMARY

Developers of the present technology have appreciated certain technical drawbacks associated with prior art solutions for transmitting messages. Conventional actor systems, for example, have drawbacks with regard to message delivery and responsiveness of message non-delivery actions.

It should be noted that once a sending actor of a conventional actor system sends a message to a receiving actor, the sending actor waits for notification of receipt from the receiving actor. If the actor does not receive this notification within a pre-determined timeout interval, the message may be deemed undelivered. A variety of reasons may cause a non receipt of the notification by the sending actor within the pre-determined timeout interval.

In one example, the mailbox of the receiving actor may be full (or almost full) so that the pre-determined timeout interval expires before the receiving actor gets to the message in question. In another example, the receiving actor may be down ("dead") or otherwise unresponsive. As such, the sending actor does not receive the notification since the message has not been successfully received by the receiving actor. In a further example, assuming that the receiving actor is a remote/external actor (e.g., part of a different actor system than the sending actor), a communication link between the respective actor systems of the sending actor and of the receiving actor may not be functional. In this example, the message may not be successfully sent to the receiving actor, and therefore, the receiving actor does not issue the notification.

Irrespective of the specific reason why this notification is not received, the sending actor of a conventional actor system is configured to wait until the pre-determined timeout interval expires before triggering a remedial action with regard to the message. This "waiting" performed by the sending actor is undesirable, since it introduces delays in the distributed processing of data by the conventional actor system.

Developers of the present technology have devised methods and systems where actors are able to trigger remedial actions with regard to messages without "waiting" for a pre-determined timeout interval to expire. In other words, methods and systems of the present technology enable determining that (i) a given message has not been successfully received by a destination/receiving actor (e.g., that the destination/receiving actor is "dead" or unresponsive), and/or (ii) a communication link between the departure/sending actor and the destination/receiving actor is not functional, and that, without waiting for a pre-determined timeout interval to expire.

In some non-limiting embodiments of the present technology, it is contemplated that actors may generate messages in a particular manner that may allow actor systems, and/or actors within actor systems, to keep track of message deliveries and communication sessions established between actors. As a result, actor systems, and/or actors within actor systems, may identify issues with message deliveries and communication sessions, without having the actor sending the message to wait for a pre-determined timeout interval to expire, in order to cause remedial actions to be performed.

In a first broad aspect of the present technology, there is provided a method of transmitting a message. The message is to be transmitted from a first actor to a second actor. The first actor is hosted by an actor system. The actor system is implemented in a distributed computer system. The method comprises generating, by the first actor of the actor system, the message. The message including payload data indicative of information to be provided by the first actor to the second actor, and a first trigger for triggering verification of whether the second actor has successfully received the message. The method comprises sending, by the first actor of the actor system, the message to the second actor. The method comprises in response to determining, by the actor system in response to the first trigger, that the second actor has not successfully received the message, instructing, by the actor system, the first actor that the message is not received by the second actor.

In some embodiments of the method, the actor system is a first actor system, the distributed computer system has a second actor system, and the method further comprises identifying by the actor system whether the message is a local message or an external message. A given local message is to be transmitted between the first actor and the second actor and where the second actor is part of the first actor system. A given external message is to be transmitted between the first actor and the second actor, and where the second actor is part of the second actor system.

In some embodiments of the method, the respective first actor system and the second actor system are executed on respective different computer devices of the distributed computer system.

In some embodiments of the method, the first actor and the second actor are respective State Machines (SMs).

In some embodiments of the method, the message is the external message. the message further includes a second trigger for triggering verification of whether a communication link is maintained between the first actor and the second actor. The first actor system comprises a first gateway actor. The second actor system comprises a second gateway actor. The first gateway actor and the second gateway actor are configured to transmit messages between the first actor system and the second actor system. The instructing the first actor that the message is not received by the second actor is in response to at least one of: (i) determining, in response to the first trigger, that the second actor has not successfully received the message; and (ii) determining, in response to the second trigger, that the communication link is not functional.

In some embodiments of the method, the first actor, the second actor, the first gateway actor, and the second gateway actor are all implemented as State Machines (SMs).

In some embodiments of the method, the first actor and the second actor are implemented as SMs of a first type and the first gateway actor and the second gateway actor are implemented as SMs of the second type. The SMs of the first type do not have access to communication protocols executed between the first actor system and the second actor system. The SMs of the second type have access to communication protocols executed between the first actor system and the second actor system.

In some embodiments of the method, the sending the message comprises: sending the message from the first actor to the first gateway actor, sending the message by the first gateway actor to the second gateway actor, and sending the message by the second gateway actor to the second actor.

In some embodiments of the method, the determining that the communication link is not functional comprises determining, by the first gateway actor, that a communication link between the first gateway actor and the second gateway actor is not functional.

In some embodiments of the method, the determining that the communication link between the first gateway actor and the second gateway actor is not functional is performed by at least one of a pinging-type mechanism, and a heartbeat-type mechanism.

In some embodiments of the method, the determining that the second actor has not received the message comprises determining, by the second gateway actor, that the second actor has not received the message.

In some embodiments of the method, the message is the internal message, and the sending the message comprises directly sending the message from the first actor to the second actor.

In some embodiments of the method, the instructing is executed in response to directly sending the message from the first actor to the second actor.

In some embodiments of the method, the actor system is implemented as a State Machine (SM).

In some embodiments of the method, the instructing, by the actor system, the first actor that the message is not received by the second actor causes the first actor to take a remedial action in regard to the message.

In some embodiments of the method, the remedial action is executed without waiting for a timeout period to expire.

In some embodiments of the method, the remedial action is executed without the first actor having to maintain a timeout period process.

In some embodiments of the method, the instructing the first actor that the message is not received by the second actor causes the first actor to take a remedial action in regard to the message.

In some embodiments of the method, the remedial action is executed without waiting for a timeout period to expire.

In some embodiments of the method, the remedial action is executed without the first actor having to maintain a timeout period process.

In a second broad aspect of the present technology, there is provided a distributed computed system implementing an actor system. The actor system hosts a first actor. A message is to be transmitted from the first actor to a second actor. The first actor is configured to generate the message. The message includes payload data indicative of information to be provided by the first actor to the second actor, and a first trigger for triggering verification of whether the second actor has successfully received the message. The first actor is configured to send the message to the second actor. In response to determining, by the actor system in response to the first trigger, that the second actor has not successfully received the message, the actor system is configured to instruct the first actor that the message is not received by the second actor.

In some embodiments of the distributed computer system, the actor system is a first actor system, the distributed computer system hosts a second actor system, and the first actor system is further configured to identify whether the message is a local message or an external message. A given local message is to be transmitted between the first actor and the second actor, and where the second actor is part of the first actor system. A given external message is to be transmitted between the first actor and the second actor, and where the second actor is part of the second actor system.

In some embodiments of the distributed computer system, the respective first actor system and the second actor system are executed on respective different computer devices of the distributed computer system.

In some embodiments of the distributed computer system, the first actor and the second actor are respective State Machines (SMs).

In some embodiments of the distributed computer system, the message is the external message. The message further includes a second trigger for triggering verification of whether a communication link is maintained between the first actor and the second actor. The first actor system comprises a first gateway actor. The second actor system comprises a second gateway actor. The first gateway actor and the second gateway actor are configured to transmit messages between the first actor system and the second actor system. The actor system is configured to instruct the first actor that the message is not received by the second actor is in response to at least one of: (i) determining, in response to the first trigger, that the second actor has not successfully received the message, and (ii) determining, in response to the second trigger, that the communication link is not functional.

In some embodiments of the distributed computer system, the first actor, the second actor, the first gateway actor, and the second gateway actor are all implemented as State Machines (SMs).

In some embodiments of the distributed computer system, the first actor and the second actor are implemented as SMs of a first type and the first gateway actor and the second gateway actor are implemented as SMs of the second type. The SMs of the first type do not have access to communication protocols executed between the first actor system and the second actor system. The SMs of the second type have access to communication protocols executed between the first actor system and the second actor system.

In some embodiments of the distributed computer system, the first actor configured to send the message comprises the first actor being configured to send the message to the first gateway actor, the first gateway actor being configured to send the message to the second gateway actor, and the second gateway actor being configured to send the message to the second actor.

In some embodiments of the distributed computer system, the determining that the communication link is not functional comprises the first gateway actor configured to determine that a communication link between the first gateway actor and the second gateway actor is not functional.

In some embodiments of the distributed computer system, the determining that the communication link between the first gateway actor and the second gateway actor is not functional is performed by at least one of a pinging-type mechanism, and a heartbeat-type mechanism.

In some embodiments of the distributed computer system, the determining that the second actor has not received the message comprises the second gateway actor configured to determine that the second actor has not received the message.

In some embodiments of the distributed computer system, the message is the internal message. The sending the message comprises the first actor being configured to directly send the message to the second actor.

In some embodiments of the distributed computer system, the actor system configured to instruct is executed in response to the first actor configured to directly send the message to the second actor.

In some embodiments of the distributed computer system, the actor system is implemented as a State Machine (SM).

In some embodiments of the distributed computer system, the actor system configured to instruct the first actor that the message is not received by the second actor causes the first actor to take a remedial action in regard to the message.

In some embodiments of the distributed computer system, the remedial action is executed without waiting for a timeout period to expire.

In some embodiments of the distributed computer system, the remedial action is executed without the first actor having to maintain a timeout period process.

In some embodiments of the distributed computer system, instructing the first actor that the message is not received by the second actor causes the first actor to take a remedial action in regard to the message.

In some embodiments of the distributed computer system, the remedial action is executed without waiting for a timeout period to expire.

In some embodiments of the distributed computer system, the remedial action is executed without the first actor having to maintain a timeout period process.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology.

Figure 1:
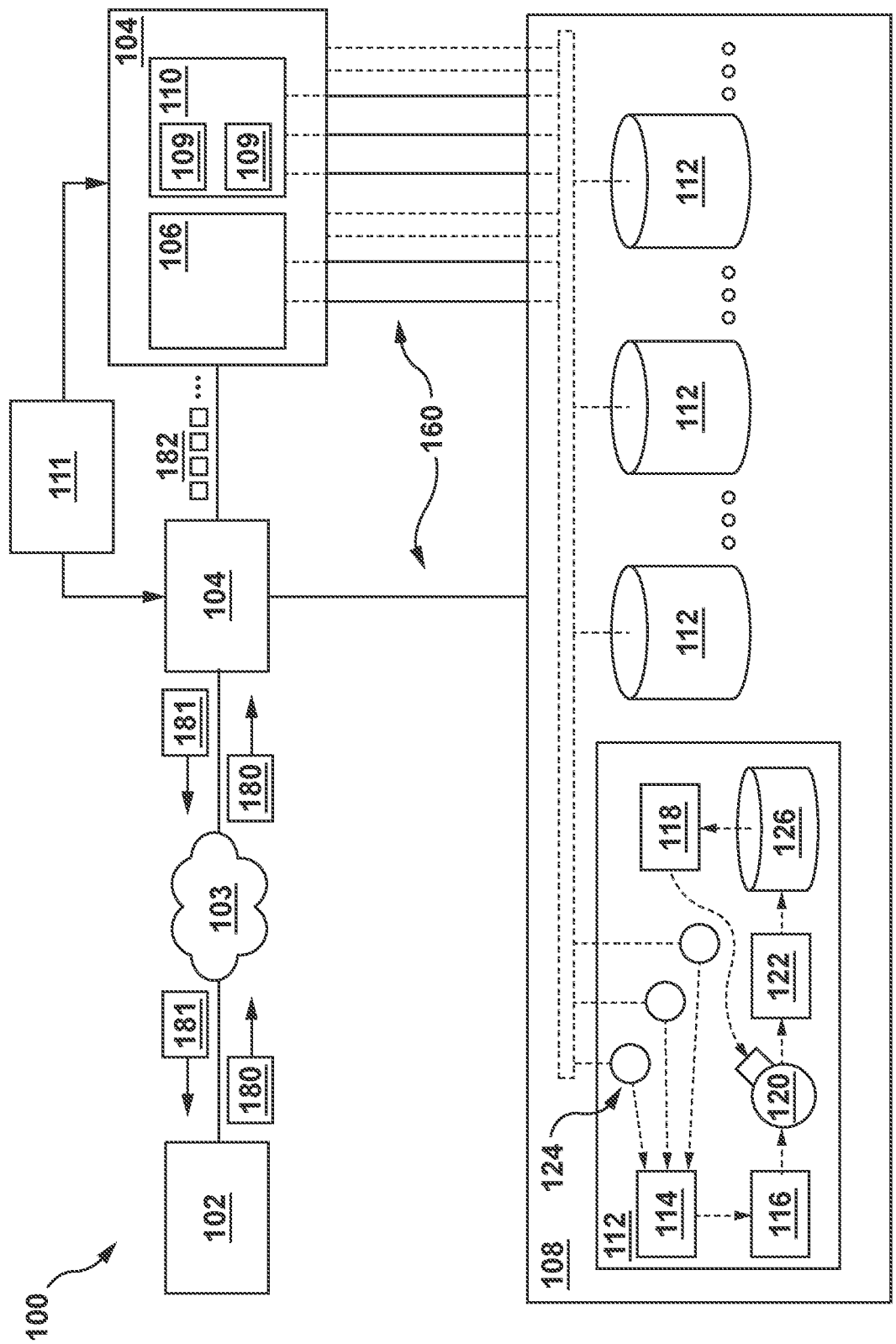
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100; however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective transaction destination locations TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
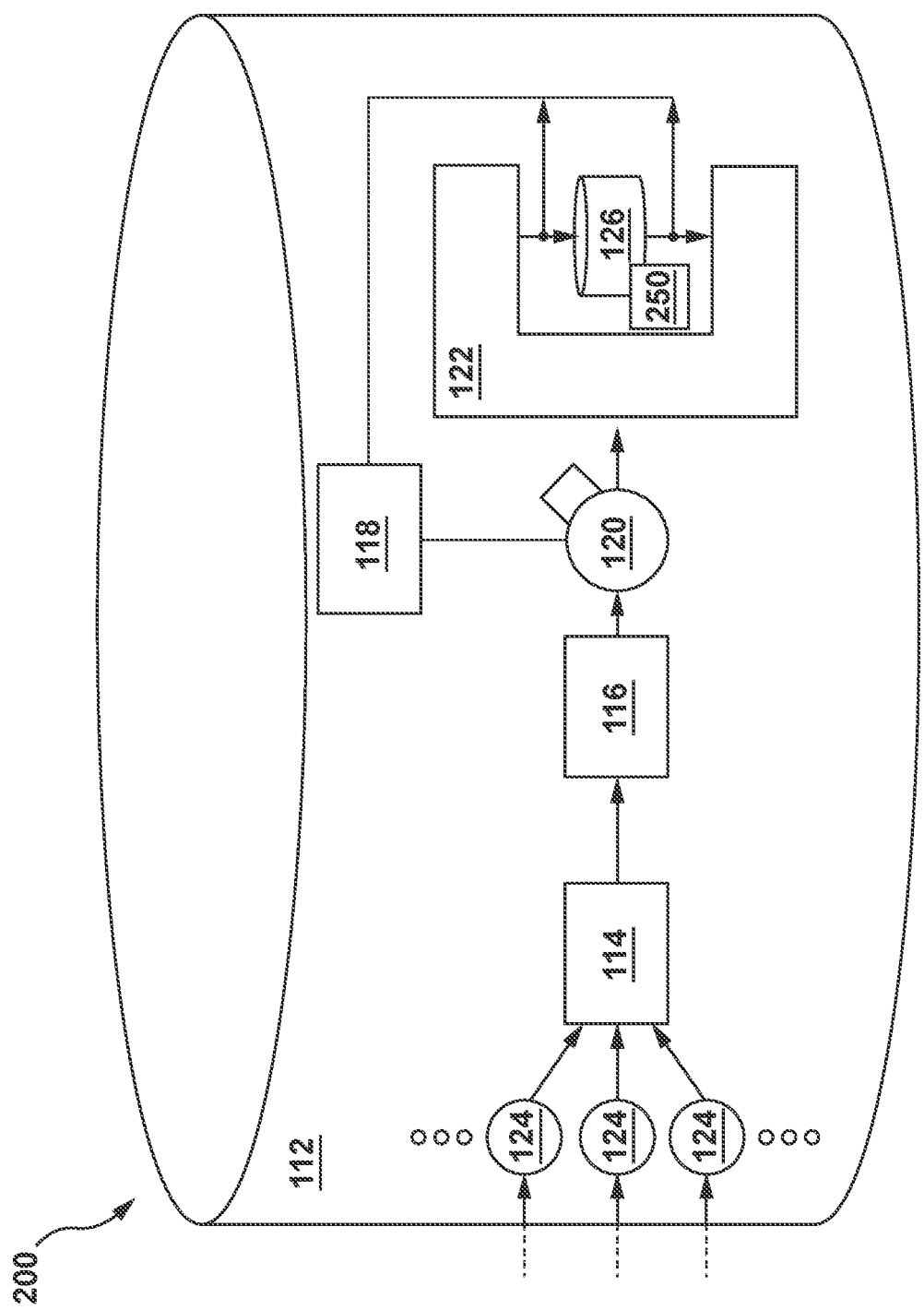
FIG. 2 depicts a storage device of a distributed storage sub-system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy 124 is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the operation scheduling application 120 may be implemented as part of the Pdrive application 116. In other words, execution of various scheduling schemes may be performed by the Pdrive application 116, without departing from the scope of the present technology.

It is contemplated that, the operation scheduling application 120 may provide a hybrid scheduling scheme. For example, the operation scheduling application 120 may provide a scheduling scheme that is of a "fair" type and, under certain conditions, is also of a "real-time" type.

It should be noted that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In summary, the operation scheduling application 120 may provide a hybrid scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for a current execution, a most efficient one (from the perspective of the memory drive 126) amongst all the I/O operations available to the memory drive 126 at a given moment in time.

For that reason, in some cases, although the operation scheduling application 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the operation scheduling application 120.

Therefore, it may happen that the execution order may no longer respect the real-time requirements of the distributed processing system 100 (especially as additional I/O operations are received from the operation scheduling application 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the operation scheduling application 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the operation scheduling application 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Actor Systems

Figure 3:
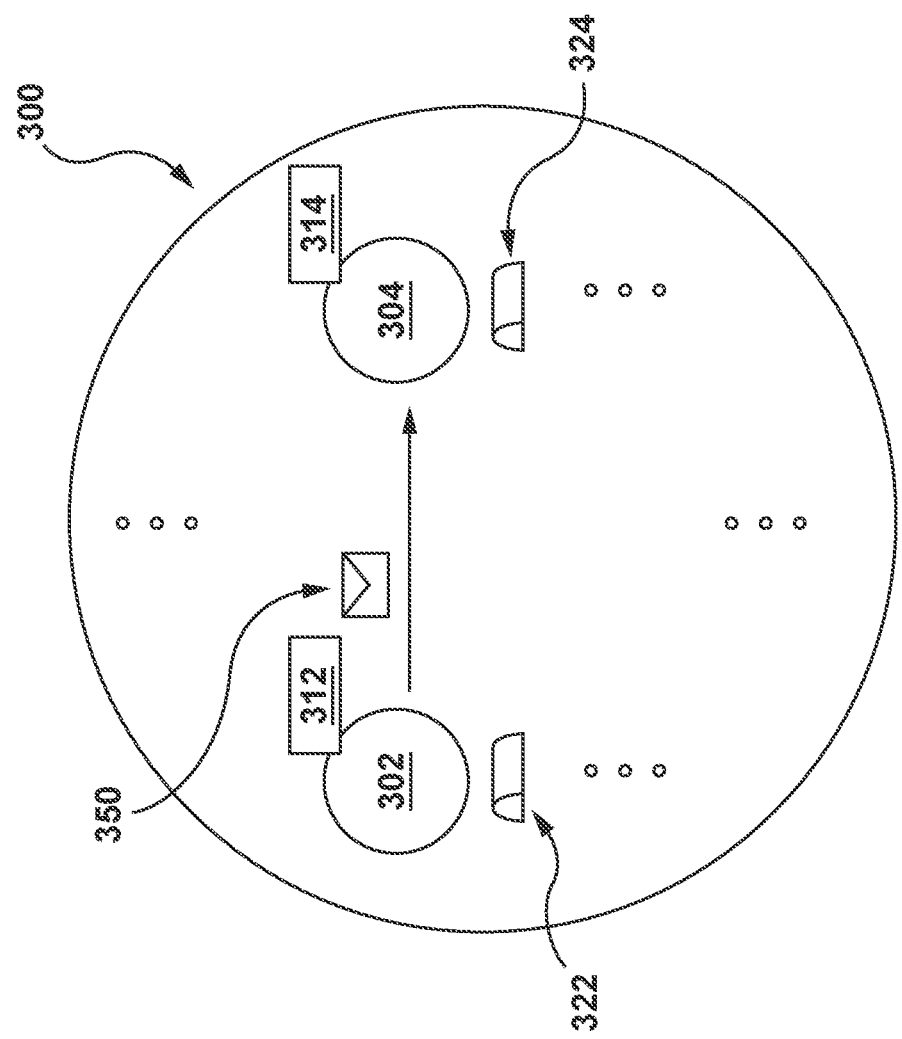
FIG. 3 depicts a conventional actor system implemented in some prior art technologies.

With reference to FIG. 3, there is depicted a conventional actor system 300. Actor systems are typically implemented for performing distributed processing of data. For example, the conventional actor system 300 comprises a first actor 302 and a second actor 304. The first actor 302 and the second actor 304 are sometime referred to as "processing units" of the conventional actor system 300 which are created/launched for processing data in a distributed manner.

A given actor (such as one of the first actor 302 and the second actor 304) in the conventional actor system 300 may be configured to inter alia send a message to other actors, and designate how messages received thereby are to be handled. For example, the first actor 302 may be configured to send a message 350 to the second actor 304, and the second actor 304 may designate how the message 350 received thereby is to be handled.

The first actor 302 and the second actor 304 may have respective addresses for communication purposes. For example, the first actor 302 has a first address 312, while the second actor 304 has a second address 314. In order to send the message 350 to the second actor 304, the first actor 302 has knowledge of the second address 314 of the second actor 304.

It is contemplated that a given address of a given actor may be indicative of whether the given actor is a local actor or otherwise a remote/external actor. In the example illustrated in FIG. 3, the second address 314 of the second actor 304 comprises information that is indicative of that the second actor 304 is a local actor—that is, that the second actor 304 is part of the same actor system (i.e., the conventional actor system 300) as the first actor 302. However, in a case, where the second actor 304 is part of another actor system (a different actor system from the conventional actor system 300), the second address 314 may comprise information indicative that the second actor 304 is a remote/external actor—that is, that the second actor 304 and the first actor 302 are part of different actor systems.

The first actor 302 and the second actor 304 also have respective mailboxes for communication purposes. For example, the first actor 302 has a first mailbox 322, while the second actor 304 has a second mailbox 324. The purpose of a given mailbox is to serve as a message processing queue for messages received by the respective actor. For example, the first mailbox 322 may be used as a message processing queue for messages received by the first actor 302, while the second mailbox 324 may be used as a message processing queue for messages received by the second actor 304. Messages in a given mailbox may be processed by a respective actor in a First-In-First-Out (FIFO) order, for example.

Each actor in the conventional actor system 300 has a respective "state" that can be modified based on information received through a message from another actor. For example, the second actor 304 has a given current state. The message 350 comprises payload data indicative of information to be provided from the first actor 302 to the second actor 304. Once the message 350 is successfully received by the second actor 304, the second actor 304 can process the message 350 and can transition into a new given state based on (i) the given current state thereof and (ii) the payload data of the message 350.

In the conventional actor system 300, actors are implemented with timeout mechanisms for ensuring that messages sent thereby are processed and, if not, to trigger remedial actions with regard to those messages. For example, when the first actor 302 sends the message 350 to the second actor 304, the first actor 302, in a sense, "expects" a notification from the second actor 304, within a pre-determined timeout interval, indicative of that the message 350 has been processed by the second actor 304.

If the first actor 302 receives the notification from the second actor 304 within the pre-determined timeout interval, the message 350 is considered as being successfully processed by the second actor 304.

If the first actor 302 does not receive the notification from the second actor 304 within the pre-determined timeout interval, the message 350 is considered not to have been successfully processed and, as a result, the first actor 302 may perform a remedial action with regard to the message 350. For example, a remedial action may include re-sending the message 350 to the second actor 304, sending the message 350 to another actor, and the like.

A variety of reasons may cause a non receipt of the notification by the first actor 302 within the pre-determined timeout interval.

In one example, the second mailbox 324 of the second actor 304 may be full (or almost full) so that the pre-determined timeout interval expires before the second actor 304 gets to the message 350 amongst all the messages in the second mailbox 324.

In another example, the second actor 304 may be down ("dead") or otherwise unresponsive. As such, the first actor 302 does not receive the notification since the message 350 has not been successfully received by the second actor 304.

In a further example, assuming that the second actor 304 is a remote/external actor (e.g., part of a different actor system than the first actor 302), a communication link between the respective actor systems of the first actor 302 and of the second actor 304 may not be functional. In this example, the message 350 may not be successfully sent to the second actor 304, and therefore, the second actor 304 does not issue the notification.

Irrespective of the specific reason why the notification is not received by the first actor 302, the first actor 302 of the conventional actor system 300 is configured to wait until the pre-determined timeout interval expires before triggering a remedial action with regard to the message 350. This "waiting" performed by the first actor 302 is undesirable, since it introduces delays in the distributed processing of data by the conventional actor system 300.

Developers of the present technology have devised methods and systems where actors are able to trigger remedial actions with regard to messages without "waiting" for a pre-determined timeout interval to expire. In other words, methods and systems of the present technology enable determining that (i) a given message has not been successfully received by a destination actor (e.g., that the destination actor is "dead" or unresponsive), and/or (ii) a communication link between the departure actor and the destination actor is not functional, and that, without waiting for a pre-determined timeout interval to expire.

In some non-limiting embodiments of the present technology, it is contemplated that actors may generate messages in a particular manner that may allow actor systems, and/or actors within actor systems, to keep track of message deliveries and communication sessions established between actors. As a result, actor systems, and/or actors within actor systems, may identify issues with message deliveries and communication sessions, without having the departure actor to wait for a pre-determined timeout interval to expire, in order to cause remedial actions to be performed.

Figure 4:
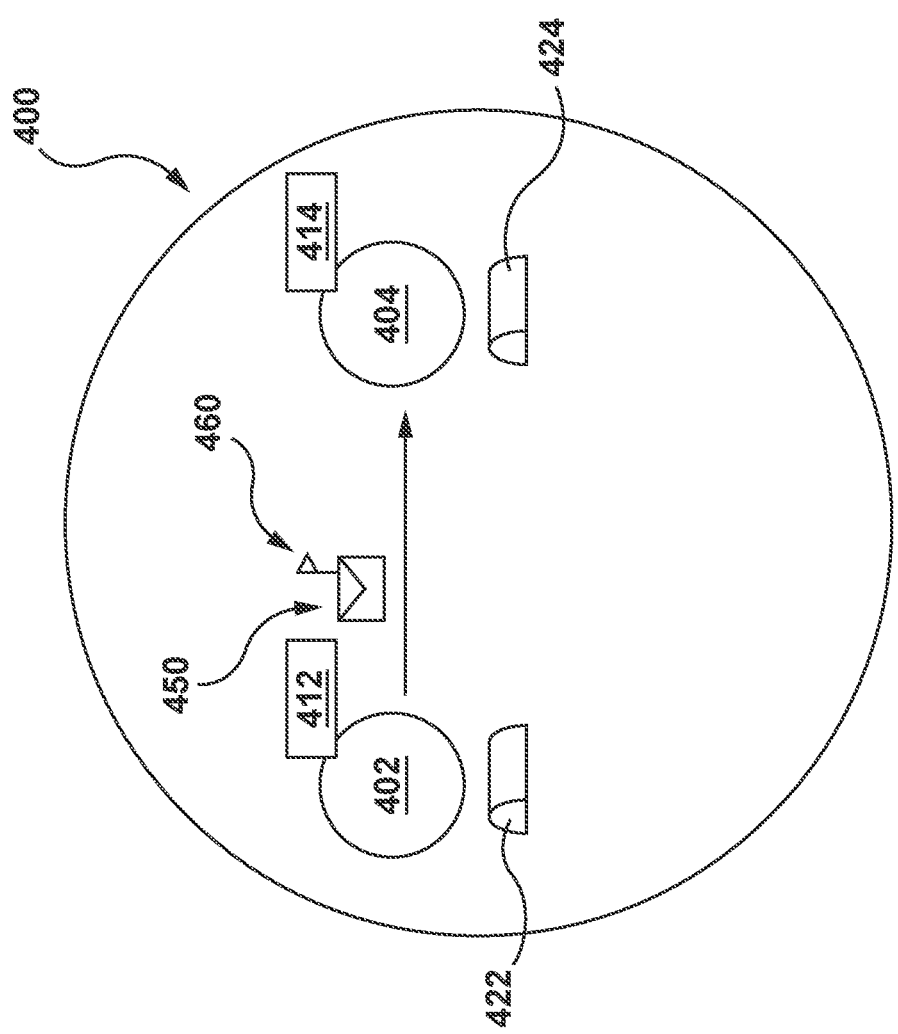
FIG. 4 depicts an embodiment of an actor system implemented in the system of FIG. 1 in accordance with some embodiments of the present technology.

With reference to FIG. 4, there is depicted an actor system 400 as envisioned in some non-limiting embodiments of the present technology. The actor system 400 comprises a first actor 402 and a second actor 404. The first actor 402 has a first address 412 and a first mailbox 422, while the second actor 404 has a second address 414 and a second mailbox 424.

In a non-limiting example of the present technology, the first actor 402 may be implemented as a first given port of the transaction routing sub-system 106 (see FIG. 1), while the second actor 404 may be implemented as a second given port of the transaction routing sub-system 106. As such, it is contemplated that the first actor 402 and the second actor 404 may be implemented as respective SMs (or respective virtual machines).

In some embodiments of the present technology, it is contemplated that the actor system 400 may comprise a supervisory actor (not depicted), in addition to the first actor 402 and the second actor 404. Broadly speaking, the purpose of this supervisory actor is to boot or "launch" actors of the actor system 400 when needed. For example, if a given actor of the actor system 400 is down, the supervisory actor of the actor system 400 may be tasked with launching another actor for replacing the given actor that is down.

Let it be assumed that the first actor 402 is configured to send a message 450 to the second actor 404 for processing. However, instead of generating a given message having only payload data indicative of information to be provided by the first actor 402 to the second actor 404 (similarly to what has been explained above with respect to the message 350), the first actor 402 is configured to generate the message 450 in a specific manner, which is implemented in accordance with the non-limiting embodiments of the present technology.

The first actor 402 of the actor system 400 is configured to generate the message 450 such that the message 450 includes a first trigger 460, in addition to the payload data. The first trigger 460 is instrumental in triggering verification of whether the second actor 404 has successfully received the message 450. For example, the first trigger 460 may trigger the actor system 400 (actor system of the destination actor) to verify whether the second actor 404 has successfully received the message 450.

In some embodiments, the message 450 may be generated by the first actor 402 so as to include a first trigger field (not depicted) that includes the first trigger 460 in a form of information that is instrumental in triggering the verification of whether the second actor 404 has successfully received the message 450.

The first actor 402 is configured to send the message 450 with the first trigger 460 to the second actor 404. For example, the first actor 402 may have knowledge of the second address 414 of the second actor 404. In this case, the second address 414 may be indicative of that the second actor 404 is a local actor—that is, the second actor 404 is part of the same actor system as the first actor 402 (e.g., the actor system 400). The first actor 402 is configured to send the message 450 to the second actor 404 based on the second address 414.

It is contemplated that since the second actor 404 is a given local actor, the message 450 is a given local message. As such, the message 450 may be directly sent (without intermediary actors, for example) from the first actor 402 to the second actor 404 by the actor system 400.

When the message 450 is sent by the first actor 402, the first trigger 460 triggers the actor system 400 to verify whether the second actor 404 successfully receives the message 450. It is contemplated that the actor system 400 may track delivery of the message 450 in response to first trigger 460.

If in response to the first trigger 460, the actor system 400 determines that the second actor 404 has successfully received the message 450, the actor system 400 may send a notification to first actor 402 indicative of that the message 450 is received by the second actor 404. For example, in this case, the message 450 may be queued in the second mailbox 424 of the second actor 404.

If in response to the first trigger 460, the actor system 400 determines that the second actor has not successfully received the message 450, the actor system 400 may send a different notification to first actor 402 that instructs the first actor 402 that the message 450 is not received by the second actor 404. For example, in this case, the actor system 400 may determine that the second actor 404 is "dead" or unresponsive.

In some embodiments of the actor system 400, the actor system 400 may have access to an actor table that lists all actors that are implemented by the actor system 400. As such, when the message 450 is being sent, in response to the first trigger 460, the actor system 400 may be configured to "look up" the second actor 404 in that actor table and verify whether the second actor 404 is "dead" or unresponsive. As such, if the second actor 404 is determined to be responsive, the actor system 400 may determine that the second actor 404 successfully received the message 450. However, if the second actor 404 is determined to be "dead" or unresponsive, the actor system 400 may determine that the second actor 404 has not successfully received the message 450.

It should be noted that the triggering of the verification of whether the second actor 404 has successfully received the message 450 by the first trigger 460 is performed without waiting for a timeout period. In other words, when the message 450 is sent by the first actor 402, the actor system 400 is triggered by first trigger 460 of the message 450 to verify whether or not the second actor 404 is "dead" or unresponsive, and that, without waiting for a time period.

In some embodiments of the present technology, it is contemplated that generating messages in the specific manner described herein—that is, generating messages with triggers (such as the first trigger 460, for example)—may be performed in combination with timeout period processes that may be performed by actors of a given actor system. In other words, actors may implement timeout period processes, while also generating messages with triggers as described herein.

In a case where the actor system 400 instructs the first actor 402 that the message 450 is not received by the second actor 404 (that the second actor 404 did not successfully receive the message 450 because the second actor 404 is "dead" or unresponsive, for example), this instruction by the actor system 400 may cause the first actor 402 to perform a remedial action with regard to the message 450.

Again, it should be noted that the remedial action performed by the first actor 402 may be executed without waiting for a timeout period to expire. This also means that, in some embodiments of the present technology, the remedial action with regard to the message 450 may be triggered and/or performed by the first actor 402 without the first actor 402 having or needing to maintain a timeout period process.

Additionally, it should be noted that a variety of remedial actions may be performed by the first actor 402 with regard to the message 450 if the message 450 is not received by the second actor 404. Which specific remedial action is performed by the first actor 402 depends on inter alia different implementations of the present technology.

Irrespective of which specific remedial action is performed by the first actor 402, in some embodiments of the present technology, the first actor 402 may implement or otherwise have access to a remedial action algorithm. Broadly speaking, the first actor 402 may be configured to, in response to being instructed that the second actor 404 did not received the message 450, employ the remedial action algorithm for determining which specific remedial action is to be performed. For example, the selection of a specific remedial action by the remedial action algorithm may depend on, but not limited to, the payload data of the message 450.

Figure 5:
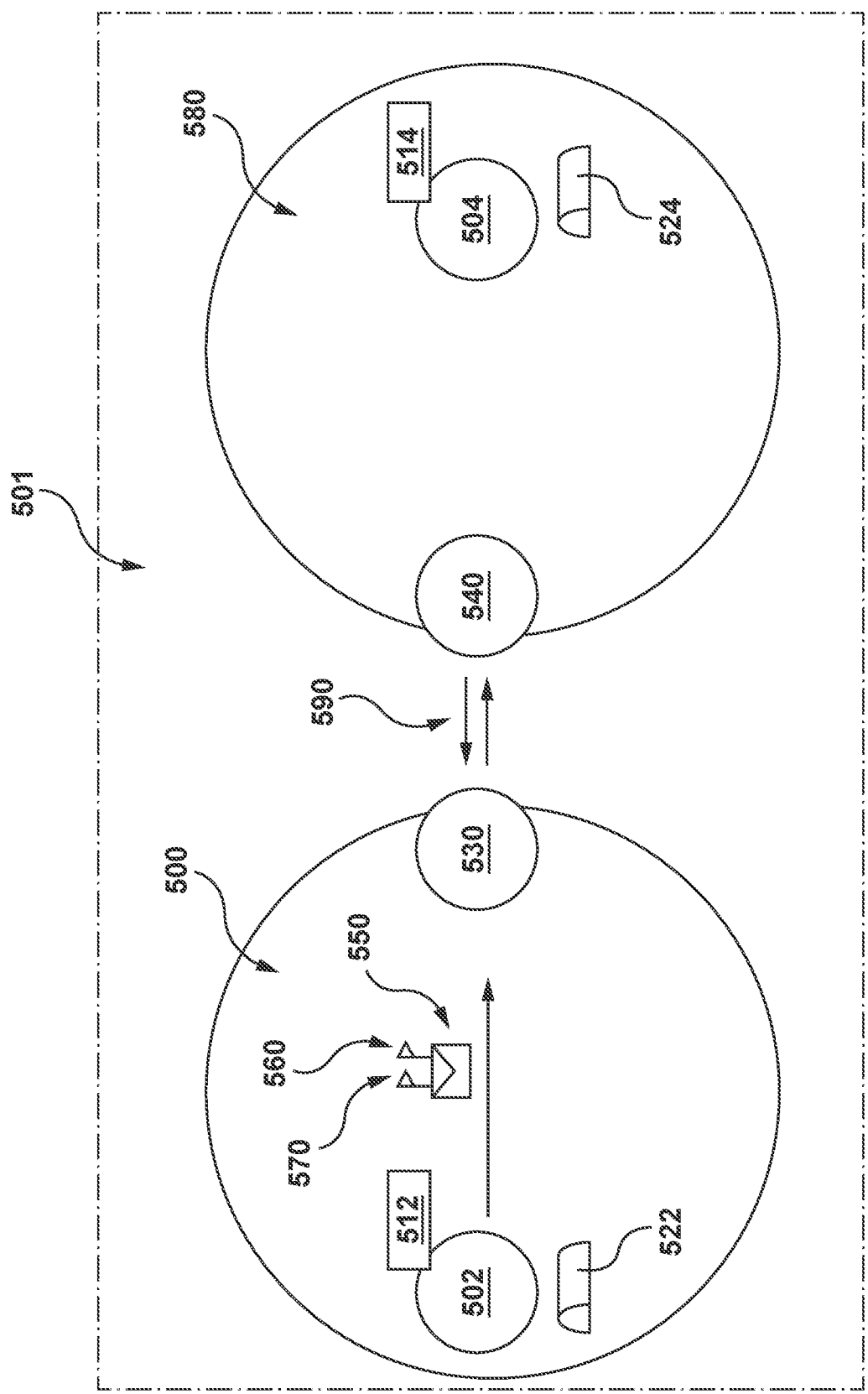
FIG. 5 depicts another embodiments of actor systems implemented in the system of FIG. 1 in accordance with some embodiments of the present technology.

With reference to FIG. 5, there is depicted a first actor system 500 and a second actor system 580 as envisioned in some non-limiting embodiments of the present technology. Both the first actor system 500 and the second actor system 580 are part of a service provision system 501. It is contemplated that, in some embodiments of the present technology, the service provision system 501 may require actors of the first actor system 500 to communicate (e.g., exchange remote/external messages) with actors from the second actor system 580.

In one non-limiting example of the present technology, the first actor system 500 may be implemented as the transaction routing sub-system 106 (see FIG. 1), while the second actor system 580 may be implemented as the database sub-system 110. In this case, the service provision system 501 may be implemented as the transaction processing sub-system 105, for example.

It should be noted that in some embodiments of the present technology, the first actor system 500 and the second actor system 580 may be communicatively coupled in accordance with a common addressing scheme (e.g., implemented in a common addressing space). For example, the addressing scheme may be implemented by the service provision system 501 for communication purposes between the first actor system 500 and the second actor system 580.

The first actor system 500 comprises a first actor 502, while the second actor system 580 comprises a second actor 504. For example, the first actor 502 may be a given port of the transaction routing sub-system 106, while the second actor 504 may be a given shard 109 of the database sub-system 110.

However, in addition, the first actor system 500 also comprises a first gateway actor 530, while the second actor system 580 also comprises a second gateway actor 540. Broadly speaking, gateway actors are implemented by respective actor systems and are used for communication purposes between actors systems of the service provision system 501. In other words, the first actor 502 may not send a message 550 directly to the second actor 504, since the second actor 504 is a remote/external actor. Instead, the message 550 may be routed from the first actor 502 to the second actor 504 via the first gateway actor 530 and the second gateway actor 540. How the message 550 may be generated and routed from the first actor 502 to the second actor 504 will now be described.

As illustrated in FIG. 5, the first actor 502 has a first address 512 and a first mailbox 522, while the second actor 504 has a second address 514 and a second mailbox 524.

The first actor 502 is configured to generate the message 550 that is to be sent to the second address 514 (associated with the second actor 504). The first actor system 500 may determine that the second address 514 is a remote/external address to the first actor system 500. For example, the first actor system 500 may determine that the second address 514 is not associated with any actor of its own, but rather that the second address 514 is a given address of within the second actor system 580. In such a case, the first actor system 500 may be configured to send the message 550 from the first actor 502 to the first gateway actor 530.

The first gateway actor 530 maintains a communication link 590 with the second gateway actor 540. The communication link 590 enables communication between actors of the first actor system 500 and actors of the second actor system 580. In other words, messages between actors of the first actor system 500 and actors of the second actor system 580 are exchanged via the communication link 590.

Hence, once the message 550 is received by the first gateway actor 530, the first gateway actor 530 may send the message 550 via the communication link 590 to the second gateway actor 540. When the second gateway actor 540 receives the message 550, the second actor system 580 may be configured to determine that the message 550 is destined to the second address 514. As such, the second actor system 580 may send the message 550 from the second gateway actor 540 to the second actor 504 based on the second address 514.

In some embodiments of the present technology, the message 550 may include payload data to be provided by the first actor 502 to the second actor 504, as well as a first trigger 560 and a second trigger 570. The purpose and functionality of the first trigger 560 and of the second trigger 570 will now be described in turn.

The purpose of the first trigger 560 is to trigger verification of whether the second actor 504 successfully receives the message 550. When the message 550 is received by the second gateway actor 540, the first trigger 560 triggers the second actor system 580 (the actor system of the destination actor being the second actor 504) to verify whether the second actor 504 successfully receives the message 550.

For example, similarly what has been described above for the first trigger 460 of the message 450 depicted in FIG. 4, if the second actor system 580 determines that the second actor 504 is "dead" or unresponsive, the second actor system 580 may instruct the first actor 502 that the message 550 is not received by the second actor 504.

To that end, the second actor system 580 may instruct the second gateway actor 540 to generate a notification on behalf of the second actor 504 indicative of the message 550 not having been received by the second actor 504, and send this notification back to the first gateway actor 530 via the communication link 590, and from which this notification is sent by the first actor system 500 to the first actor 502.

If the second actor system 580 determines that the second actor 504 is responsive, a notification indicative of that the message 550 is received by the second actor 504 may be sent from the second gateway actor 540 to the first gateway actor 530 and then to the first actor 502.

The purpose of the second trigger 570 is to trigger verification of whether communication is established between the first actor 502 and the second actor 504. When the message 550 is received by the first gateway actor 530, the second trigger 570 triggers the first gateway actor 530 to verify whether the communication link 590 is established and functional.

For example, the first gateway actor 530 may be configured to employ a pining-type mechanism with the second gateway actor 540 in order to keep track of whether the communication link 590 is functional. In another example, the first gateway actor 530 may be configured to employ a TCP/IP-type mechanism with the second gateway actor 540 in order to keep track of whether the communication link 590 is functional. Which specific mechanism the first gateway actor 530 may employ for verifying whether the communication link 590 is functional may depend on inter alia how lower layers of the service provision system 501 are implemented.

It should also be noted that that the first gateway actor 530 may store information regarding messages that have been received thereby for external transmission to external actor systems (such as the second actor system 580). For example, when the message 550 is received by the first gateway actor

530, the first gateway actor 530 may store information regarding the first address 512 of the first actor 502 that generated the message 550 and the second address 514 of the second actor 504 that is to receive the message 550.

As mentioned above, the first gateway actor 530 may send the message 550 to the second gateway actor 540. In response to the second trigger 570, the first gateway actor 530 may keep track of whether the communication link 590 is functional while and/or after sending the message 550. If the first gateway actor 530 determines that communication link 590 is not functional, the first gateway actor 530 may send a notification to the first actor 502 (based on the information that has been stored when the message 550 was received by the first gateway actor 530) instructing the first actor 502 that the message 550 is not received by the second actor 504.

Figure 6:
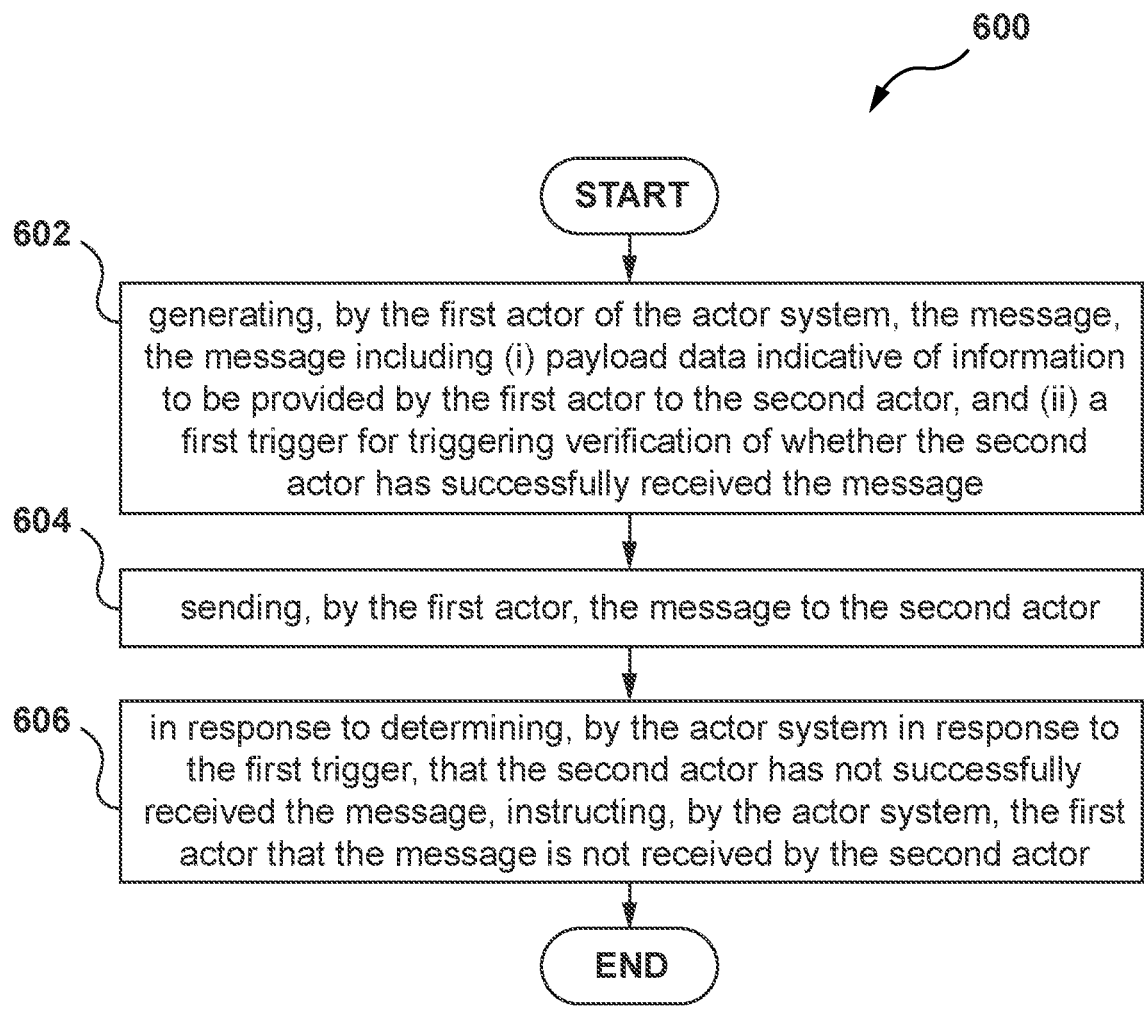
FIG. 6 depicts a block diagram of a method for transmitting a message being implemented in accordance with non-limiting embodiments of the present technology.

In some embodiments of the present technology, a method 600 depicted in FIG. 6 may be performed by one or more actor systems. The method 600 will now be described in greater details.

Step 602: Generating, by the First Actor of the Actor System, the Message, the Message Including (i) Payload Data Indicative of Information to be Provided by the First Actor to the Second Actor, and (ii) a First Trigger for Triggering Verification of Whether the Second Actor has Successfully Received the Message The method 600 begins at step 602 with a first actor of an actor system generating a message. Let's take the example of the first actor 402 of the actor system 400 depicted in FIG. 4. The message 450 is to be transmitted from the first actor 402 to the second actor 404.

It is contemplated that in some embodiments of the present technology, the first actor 402 and the second actor 404 may be implemented as respective SMs. Also, in other embodiments of the present technology, the actor system 400 may be implemented in the distributed computer system 100 (see FIG. 1).

The message 450 is generated by the first actor 402 such that the message 450 includes (i) payload data indicative of information to be provided by the first actor 402 to the second actor 404, and (ii) a first trigger 460 for triggering verification of whether the second actor 404 has successfully received the message 450.

In some embodiments, the actor system 400 may be configured to identify whether the message 450 is a local message or a remote/external message. The actor system 400 may identify the message 450 as being a local message because the message 450 is to be transmitted between the first actor 402 and the second actor 404 which are both part of the actor system 400.

In some embodiments, a given message to be transmitted may be generated such that it further includes a second trigger. Let's take the example of the message 550 generated by the first actor 502 of the first actor system 500 as seen in FIG. 5. In addition to the first trigger 560 and to respective payload data, the message 550 includes the second trigger 570 for triggering verification of whether a communication link is maintained between the first actor 502 and the second actor 504.

In this case, the first actor system 500 may identify the message 550 as being a remote/external message because the message 550 is to be transmitted between the first actor 502 and the second actor 504 which are not part of a same actor system—that is, the first actor 502 is part of the first actor system 500, while the second actor 504 is part of the second actor system 580.

It is contemplated that in some embodiments of the present technology, the first actor system 500 and the second actor system 580 may be executed on respective different computer devices of the distributed computer system 100 (see FIG. 1). For example, the first actor system 500 and the second actor system 580 may be implemented on different storage devices 112.

Step 604: Sending, by the First Actor, the Message to the Second Actor

The method 600 continues to step 604 with the first actor sending the message to the second actor. Let's take the example of the message 450 in FIG. 4. The first actor 402 may send the message 450 to the second actor 404. In this case, the message 450 may be transmitted by the actor system 400 from the first actor 402 to the second actor 404.

Recalling that the message 450 is an internal message, the message 450 may be directly sent from the first actor 402 to the second actor 404. For example, the message 450 may be directly transmitted by actor system 400 from the first actor 402 to the second actor 404 without the message 450 being received by intermediary actors.

In the non-limiting example of FIG. 5, the message 550 is a remote/external message. In that case, the first actor system 500 has the first gateway actor 530 and the second actor system 580 has the second gateway actor 540. The first gateway actor 530 and the second gateway actor 540 are configured to transmit messages between the first actor system 500 and the second actor system 580. The first gateway actor 530 and the second gateway actor 540 may be implemented as respective SMs.

In some embodiments of the present technology, the first actor 502 and the second actor 504 may be implemented as SMs of a first type, while the first gateway actor 530 and the second gateway actor 540 may be implemented as SMs of a second type. The SMs of the first type may not have access to communication protocols executed between the first actor system 500 and the second actor system 580. The SMs of the second type may have access to communication protocols executed between the first actor system 500 and the second actor system 580.

In the non-limiting example of FIG. 5, sending the message 550 may comprise (i) sending the message 550 from the first actor 502 to the first gateway actor 530 (for example, the first actor system 500 may transmit the message 550 from the first actor 502 to the first gateway actor 530), (ii) sending the message 550 by the first gateway actor 530 to the second gateway actor 540 (for example, via the communication link 590), and (iii) sending the message 550 by the second gateway actor 540 to the second actor 504 (for example, the second actor system 580 may transmit the message 550 from the second gateway actor 540 to the second actor 504).

Step 606: In Response to Determining, by the Actor System in Response to the First Trigger, that the Second Actor has not Successfully Received the Message, Instructing, by the Actor System, the First Actor that the Message is not Received by the Second Actor The method 600 ends at step 606 with the actor system, in response to determining that the second actor has not successfully received the message, instructing the first actor that the message is not received by the second actor.

Let's take the example of the message 450 depicted in FIG. 4. In response to determining, by the actor system 400 in response to the first trigger 460, that the second actor 404 has not successfully received the message 450, the actor system 400 is configured to instruct the first actor 402 that the message 450 is not received by the second actor 404.

In some embodiments, this instruction by the actor system 400 may be executed further in response to directly sending the message 450 from the first actor 402 to the second actor 404.

It should be noted that the actor system 400 may determine in response to the first trigger 460 that the second actor 404 is dead or otherwise unresponsive and, as such, has not successfully received the message 450 sent thereto.

In some embodiments, this instruction by the actor system 400 may cause the first actor 402 to take a remedial action in regard to the message 450. It is contemplated that the remedial action may be executed (i) without waiting for a timeout period to expire and/or (ii) without the first actor 402 having to maintain a timeout period process.

In the non-limiting example depicted in FIG. 5, the first actor 502 may be instructed that the message 550 is not received by the second actor 504 in response to at least one of (i) determining, in response to the first trigger 560, that the second actor 504 has not successfully received the message 550, and (ii) determining, in response to the second trigger 570, that the communication link between the first actor 502 and the second actor 504 is not functional.

In one example, the determination that the second actor 504 has not successfully received the message 550 may comprise determining, by the second gateway actor 540, that the second actor 504 has not received the message 550. It is contemplated that the second actor system 580 may determine that the second actor is dead or otherwise unresponsive and, as such, may determine and notify the second gateway actor 540 that the second actor 504 has not successfully received the message 550.

For example, the determination that the communication link between the first actor 502 and the second actor 504 is not functional may comprise determining by the first gateway actor 530, that the communication link 590 between the first gateway actor 530 and the second gateway actor 540 is not functional. To that end, in some embodiments, the first gateway actor 530 may execute at least one of (i) a pinging-type mechanism, and (ii) a TCP/IP-type mechanism.

It is contemplated that in some embodiments of the present technology, triggers included in messages may be generated by departure/sending actors. For example, a departure/sending actor may generate a given first trigger if the message is determined (e.g., by the respective actor system) to be a local message. In another example, the departure/sending actor may generate a given first trigger and a given second trigger if the message is determined (e.g., by the respective actor system) to be a remote/external message.

In other embodiments however, triggers may be generated by other entities than the departure/sending actor. For example, at least one of a given first trigger and a given second trigger may be generated by the respective actor system of the departure/sending actor and then added to the message. In another example, a given second trigger may be generated by a given first gateway actor of a same actor system as the departure/sending actor and then added to the message.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of transmitting a message, the message to be transmitted from a first actor to a second actor, the first actor being hosted by a first actor system, the first actor system and a second actor system being implemented in a distributed computer system, the first actor system comprising a first gateway actor, the second actor system comprising a second gateway actor, the first gateway actor and the second gateway actor being configured to transmit messages between the first actor system and the second actor system, the method comprising:
   identifying, by the first actor system, whether the message is a local message or an external message to be transmitted between the first actor and the second actor:
      the local message to be transmitted between the first actor and the second actor where the second actor is part of the first actor system; and
      the external message to be transmitted between the first actor and the second actor where the second actor is part of the second actor system,
   generating, by the first actor of the first actor system, the message, the message being the external message, the message including:
      payload data including an indication of information to be provided by the first actor to the second actor;
      a first trigger for triggering verification of whether the second actor has successfully received the message; and
      a second trigger for triggering verification of whether a communication link is maintained between the first actor and the second actor,
   sending, by the first actor of the first actor system, the message to the second actor; and
   in response to at least one of (i) determining, by the first actor system in response to the first trigger, that the second actor has not successfully received the message, and (ii) determining, in response to the second trigger, that the communication link is not functional, informing, by the first actor system, the first actor that the message is not received by the second actor.

2. The method of claim 1, wherein the respective first actor system and the second actor system are executed on respective different computer devices of the distributed computer system.

3. The method of claim 1, wherein the first actor and the second actor are respective State Machines (SMs).

4. The method of claim 1, wherein the first actor, the second actor, the first gateway actor, and the second gateway actor are all implemented as State Machines (SMs).

5. The method of claim 4, wherein the first actor and the second actor are implemented as SMs of a first type and the first gateway actor and the second gateway actor are implemented as SMs of the second type, and wherein:
   the SMs of the first type do not have access to communication protocols executed between the first actor system and the second actor system; and
   the SMs of the second type have access to communication protocols executed between the first actor system and the second actor system.

6. The method of claim 1, wherein the sending the message comprises:
   sending the message from the first actor to the first gateway actor;
   sending the message by the first gateway actor to the second gateway actor; and
   sending the message by the second gateway actor to the second actor.

7. The method of claim 1, wherein the determining that the communication link is not functional comprises:

determining, by the first gateway actor, that a communication link between the first gateway actor and the second gateway actor is not functional.

8. The method of claim 7, wherein the determining that the communication link between the first gateway actor and the second gateway actor is not functional is performed by at least one of:
a pinging-type mechanism; and
a heartbeat-type mechanism.

9. The method of claim 1 wherein the determining that the second actor has not received the message comprises:
determining, by the second gateway actor, that the second actor has not received the message.

10. The method of claim 1, wherein the message is the internal message, and wherein the sending the message comprises:
directly sending the message from the first actor to the second actor.

11. The method of claim 10, wherein the informing is executed in response to directly sending the message from the first actor to the second actor.

12. The method of claim 1, wherein the first actor system is implemented as a State Machine (SM).

13. The method of claim 1, wherein the informing, by the first actor system, the first actor that the message is not received by the second actor causes the first actor to take a remedial action in regard to the message.

14. The method of claim 13, wherein the remedial action is executed without waiting for a timeout period to expire.

15. The method of claim 13, wherein the remedial action is executed without the first actor having to maintain a timeout period process.

16. A distributed computer system implementing a first actor system and a second actor system, the first actor system hosting a first actor, the first actor system comprising a first gateway actor, the second actor system comprising a second gateway actor, a message to be transmitted from the first actor to a second actor, the first gateway actor and the second gateway actor being configured to transmit messages between the first actor system and the second actor system,
the first actor being configured to:
identify whether the message is a local message or an external message to be transmitted between the first actor and the second actor:
the local message to be transmitted between the first actor and the second actor where the second actor is part of the first actor system; and
the external message to be transmitted between the first actor and the second actor where the second actor is part of the second actor system,
generate the message, the message being the external message, the message including:
payload data including an indication of information to be provided by the first actor to the second actor;
a first trigger for triggering verification of whether the second actor has successfully received the message; and
a second trigger for triggering verification of whether a communication link is maintained between the first actor and the second actor,
send the message to the second actor;
in response to at least one of (i) determining, by the first actor system in response to the first trigger, that the second actor has not successfully received the message, and (ii) determining, in response to the second trigger, that the communication link is not functional, the first actor system being configured to:
inform the first actor that the message is not received by the second actor.

17. The distributed computer system of claim 16, wherein the respective first actor system and the second actor system are executed on respective different computer devices of the distributed computer system.

18. The distributed computer system of claim 16, wherein the first actor and the second actor are respective State Machines (SMs).

19. The distributed computer system of claim 16, wherein the first actor, the second actor, the first gateway actor, and the second gateway actor are all implemented as State Machines (SMs).

20. The distributed computer system of claim 19, wherein the first actor and the second actor are implemented as SMs of a first type and the first gateway actor and the second gateway actor are implemented as SMs of the second type, and wherein:
the SMs of the first type do not have access to communication protocols executed between the first actor system and the second actor system; and
the SMs of the second type have access to communication protocols executed between the first actor system and the second actor system.

21. The distributed computer system of claim 16, wherein the first actor configured to send the message comprises:
the first actor being configured to send the message to the first gateway actor;
the first gateway actor being configured to send the message to the second gateway actor; and
the second gateway actor being configured to send the message to the second actor.

22. The distributed computer system of claim 16, wherein the determining that the communication link is not functional comprises:
the first gateway actor being configured to determine that a communication link between the first gateway actor and the second gateway actor is not functional.

23. The distributed computer system of claim 22, wherein the determining that the communication link between the first gateway actor and the second gateway actor is not functional is performed by at least one of:
a pinging-type mechanism; and
a heartbeat-type mechanism.

24. The distributed computer system of claim 16, wherein the determining that the second actor has not received the message comprises:
the second gateway actor being configured to determine that the second actor has not received the message.

25. The distributed computer system of claim 16, wherein the message is the internal message, and wherein the sending the message comprises:
the first actor being configured to directly send the message to the second actor.

26. The distributed computer system of claim 25, wherein the actor system configured to inform is executed in response to the first actor configured to directly send the message to the second actor.

27. The distributed computer system of claim 16, wherein the first actor system is implemented as a State Machine (SM).

28. The distributed computer system of claim 16, wherein the first actor system configured to inform the first actor that the message is not received by the second actor causes the first actor to take a remedial action in regard to the message.

29. The distributed computer system of claim 28, wherein the remedial action is executed without waiting for a timeout period to expire.

30. The distributed computer system of claim 28, wherein the remedial action is executed without the first actor having to maintain a timeout period process.

* * * * *